United States Patent
Cato

(10) Patent No.: US 8,634,525 B2
(45) Date of Patent: *Jan. 21, 2014

(54) METHODS, SYSTEMS, AND PRODUCTS FOR PROCESSING COMMUNICATIONS

(75) Inventor: Carliss Renee Cato, Atlanta, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/530,207

(22) Filed: Jun. 22, 2012

(65) Prior Publication Data

US 2012/0259750 A1    Oct. 11, 2012

Related U.S. Application Data

(63) Continuation of application No. 11/580,479, filed on Oct. 13, 2006, now Pat. No. 8,229,094.

(51) Int. Cl.
*H04M 15/00* (2006.01)

(52) U.S. Cl.
USPC ............ 379/114.01; 379/114.22; 379/114.23; 379/114.17

(58) Field of Classification Search
USPC ............. 379/114.01, 114.03, 114.19, 114.22, 379/127.05, 121.03
See application file for complete search history.

(56) References Cited

U.S. PATENT DOCUMENTS

| | | | |
|---|---|---|---|
| 4,677,653 A | 6/1987 | Weiner et al. | |
| 5,020,091 A | 5/1991 | Krolopp et al. | |
| 5,371,781 A | 12/1994 | Ardon | |
| 5,448,622 A | 9/1995 | Huttunen | |
| 5,675,630 A | 10/1997 | Beatty | |
| 5,764,730 A | 6/1998 | Rabe et al. | |
| 5,983,095 A | 11/1999 | Cameron | |
| 5,987,325 A | 11/1999 | Tayloe | |
| 6,178,335 B1 | 1/2001 | Vu | |
| 6,311,063 B1 | 10/2001 | Valliani et al. | |
| 6,685,088 B1 | 2/2004 | Royer et al. | |
| 6,745,040 B2 | 6/2004 | Zimmerman | |
| 6,760,762 B2 | 7/2004 | Pezzutti | |
| 6,792,479 B2 * | 9/2004 | Allen et al. | 710/10 |
| 7,064,681 B2 | 6/2006 | Horstemeyer | |
| 7,086,008 B2 * | 8/2006 | Capps et al. | 715/762 |
| 7,849,173 B1 | 12/2010 | Uhlik | |
| 2003/0093341 A1 * | 5/2003 | Millard et al. | 705/34 |
| 2004/0107259 A1 * | 6/2004 | Wallace et al. | 709/206 |
| 2004/0199464 A1 | 10/2004 | Bright et al. | |
| 2007/0043664 A1 * | 2/2007 | Wilkes | 705/40 |

* cited by examiner

*Primary Examiner* — Duc Nguyen
*Assistant Examiner* — Yosef K Laekemariam
(74) *Attorney, Agent, or Firm* — Scott P. Zimmerman, PLLC

(57) ABSTRACT

Methods, systems, and products select an account number of payment of a communication. When multiple account numbers are associated with a customer, the customer is prompted to select the account number that is billed for the communication.

20 Claims, 6 Drawing Sheets

METHODS, SYSTEMS, AND PRODUCTS FOR PROCESSING COMMUNICATIONS

CROSS-REFERENCE TO RELATED APPLICATIONS

This application is a continuation of U.S. application Ser. No. 11/580,479, filed Oct. 13, 2006, now issued as U.S. Pat. No. 8,229,094, and incorporated herein by reference in its entirety.

BACKGROUND

The exemplary embodiments generally relate to communications and, more particularly, to processing communications when multiple addresses are assigned to the same communications device.

A user should be able to establish a billing scheme for each of their communications addresses. Even though a subscriber/customer may have a single communications device, that communications device may be associated with multiple communications addresses. The subscriber, for example, may have a work telephone number and a different, personal telephone number for the same wireless device. Work-related calls are sent and received at the work telephone number, while the user's personal calls are sent and received to/from the personal telephone number. Similarly, the customer may receive work-related electronic communications (such as text messages) at a work address, while personal electronic communications are received at a personal communications address associated with the same wireless device. Even though the customer may have multiple communications addresses for the same device, no scheme currently exists to separately bill according to each communications address. That is, all communications sent and received from the device, regardless of the communications address, are billed to the same account. What is needed, however, are methods, systems, and products for processing communications according to communications addresses.

SUMMARY

The exemplary embodiments provide methods, systems, and products for processing communications. When a customer has multiple communications addresses for a single device, exemplary embodiments permit the customer to establish different billing schemes for each address. Calls to and from the customer's work telephone number, for example, may be billed to a work-related account number. Calls to and from the customer's personal telephone number may, likewise, be billed to a personal credit card or other personal account number. Electronic communications may similarly be billed to different account numbers, such that the customer may establish different billing arrangements for each communications address. The customer may determine whether a separate bill is desired for each address, or the customer may determine whether one or more addresses are grouped together on the same bill. Unlike conventional billing schemes, exemplary embodiments permit the customer to completely separate charges for categories of communications to the same communications device. No matter how many communications addresses the customer maintains for the same device, exemplary embodiments permit the customer to establish separate billing arrangements for each address.

Exemplary embodiments include a method for processing a communication. The communication is received. The communication originates from a sender's communications address, and the communication is addressed to at least one of a recipient's multiple communications addresses. These multiple communications addresses are all associated with a single device identifier. That is, the recipient communications device has multiple telephone numbers, I.P. addresses, email addresses, or any other communications addresses. The recipient's communications addresses are associated to account numbers, and at least one of the account numbers is billed for the communication.

More exemplary embodiments include a system for processing a communication. The system has a billing application stored in memory, and a processor communicates with the memory and executes the billing application. The billing application instructs the processor to process or receive the communication. The communication originates from a sender's communications address, and the communication is addressed to at least one of a recipient's multiple communications addresses. These multiple communications addresses are all associated with a single device identifier. The processor associates the recipient's communications addresses to account numbers, and the processor bills at least one of the account numbers for the communication.

Other exemplary embodiments describe a computer program product for processing a communication. This computer program product comprises a computer-readable media or medium with computer-readable instructions for receiving, processing, and/or billing for the communication. When the communication is received, the communication originates from a sender's communications address and is addressed to at least one of a recipient's multiple communications addresses. These multiple communications addresses are all associated with a single device identifier. The recipient's communications addresses are associated to account numbers, and at least one of the account numbers is billed for the communication.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
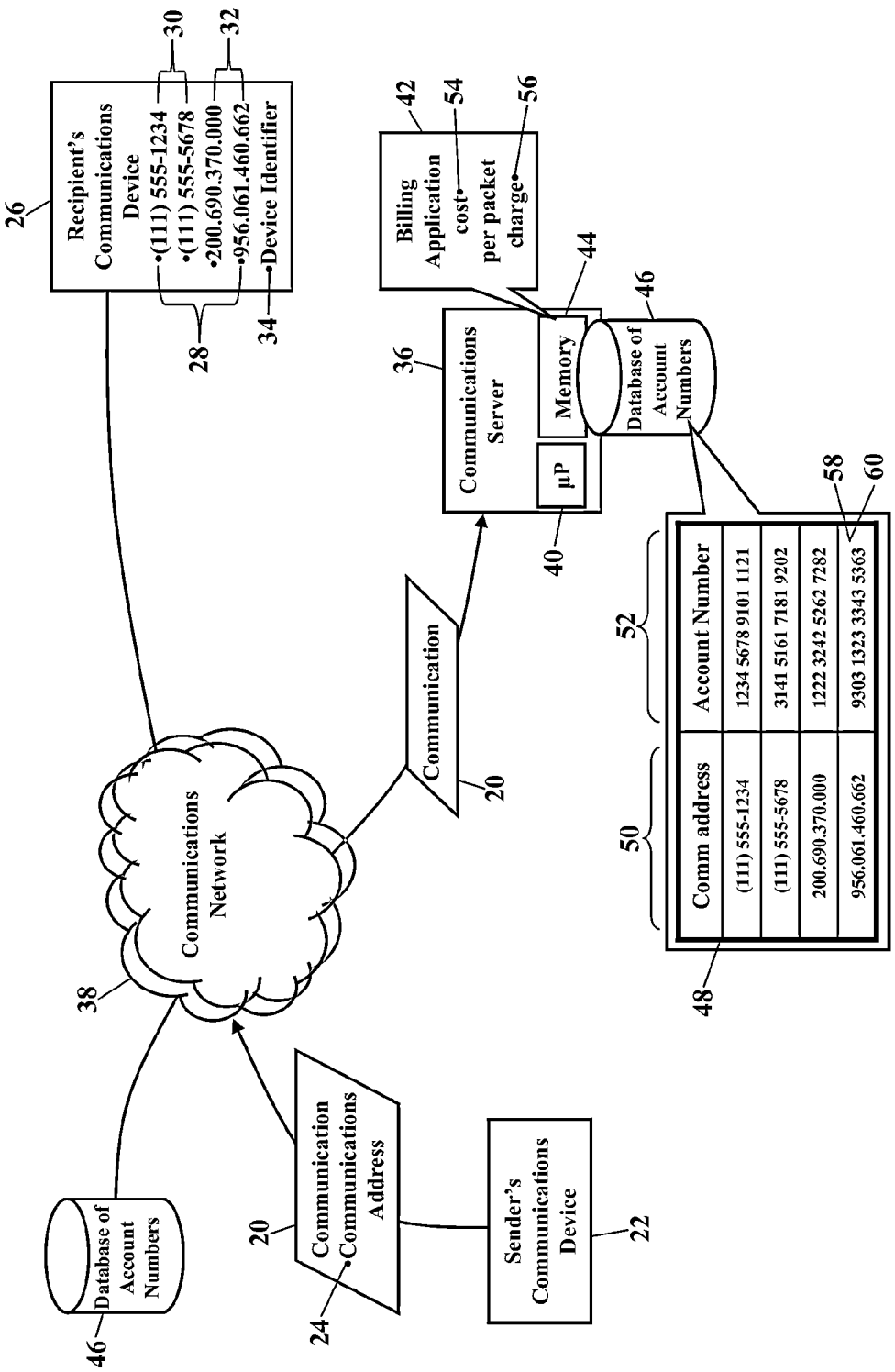
FIG. 1 is a schematic illustrating a network environment in which exemplary embodiments may be implemented.

FIG. 1 is a schematic illustrating a network environment in which exemplary embodiments may be implemented. A communication 20 originates from a sender's communications device 22. The communication 20 is addressed to a communications address 24 associated with a recipient's communications device 26. Here, however, the recipient's communications device 26 is associated with multiple communications addresses 28. That is, the recipient's communications device 26 may send and/or receive communications using any of the multiple communications addresses 28. As FIG. 1 illustrates, the recipient's communications device 26 may be associated with multiple telephone numbers 30, multiple Internet Protocol addresses 32, or even a mix of one or more of telephone numbers with one or more of Internet Protocol addresses. Even though the recipient's communications device 26 is associated with the multiple communications addresses 28, the recipient's communications device 26 may have a single device identifier 34. The device identifier 34 uniquely identifies the recipient's communications device 26. While the device identifier 34 may be a Mobile Identification Number (MIN), the device identifier 34 may be any alphanumeric number that uniquely identifies the recipient's communications device 26. Some other examples of the device identifier 34 may include a serial number, an electronic serial number (ESN), an International Roaming Mobile (IRM) identification number, an International Mobile Subscriber Identifier (IMSI), and/or a Mobile Directory Number (MDN). The device identifier 34 may additionally or alternatively include a transceiver number and/or a wafer lot number. The transceiver number is a serial number and/or a die number that uniquely identifies a transceiver and/or microprocessor operating in the recipient's communications device 26. The wafer lot number identifies a wafer lot from which the transceiver and/or the microprocessor (operating in the recipient's communications device 26) was manufactured. Either the transceiver number, or the wafer lot number, or both may be used to uniquely identify the recipient's communications device 26.

The communication 20 is processed by a communications server 36. As the communication 20 communicates along a communications network 38, the communication 20 is received by the communications server 36. The communications server 36 processes the communication 20 for billing purposes. The communications server 36 has a processor 40 (e.g., "μP"), application specific integrated circuit (ASIC), or other similar device that executes a billing application 42 stored in memory 44. The billing application 42 is a software engine or computer program that bills, charges, debits, or credits an account number for the communication 20. Because the recipient's communications device 26 is associated with the multiple communications addresses 28, the recipient may establish different billing arrangements for each communications address 28. Suppose, for example, the recipient uses a first telephone number for work-related communications, while the recipient uses a second, different telephone number for personal communications. The recipient may want work-related calls (and other communications) billed to a work-related account number, while personal calls (and other communications) are billed to a personal credit card (or other personal account number). Because the recipient's communications device 26 has the multiple communications addresses 28, the recipient may establish different billing arrangements for each communications address 28.

The billing application 42 may access a database 46 of account numbers. The database 46 of account numbers stores, tracks, cross-references, or otherwise associates communications addresses to account numbers. The database 46 of account numbers may be locally stored in the memory 44 of the communications server 36, or the database 46 of account numbers may be remotely accessible via the communications network 38. However the database 46 of account numbers is accessed, the billing application 42 may query the database 46 of account numbers. The database 46 of account numbers may store or maintain a table 48 that associates communications addresses 50 to account numbers 52. The billing application 42 instructs the processor 40 to query the database 46 of account numbers for the recipient's communications address 24 associated with the communication 20. The processor 40 thus retrieves an account number 52 associated with the respective recipient's communications address 24 (to which the communication 20 is addressed).

The billing application 42 then bills for the communication 20. The billing application 42 may actually monitor and/or track the time length of the communication 20. The billing application 42 may even monitor, count, or track the packet length of the communication 20. As the communications server 36 receives the communication 20, the billing application 42 may count, tally, or sum the number of packets making up the communication 20. The billing application 42 then calculates a cost 54 for the communication 20, based on the number of packets and a per-packet fee 56 stored in the memory 44. However the charge is determined, the billing application 42 then bills the account number 52 associated with the respective recipient's communications address 24 for the communication 20. The billing application 42, for example, may bill a financial account number 58, such as a credit card account number 60. Because the recipient may establish different billing arrangements for each communications address 50, the recipient may completely account for each communication sent and received.

FIG. 1 is only a simple illustration. Because the architecture and operating principles of the sender's communications device 22, the recipient's communications device 26, and the communications server 36 are well known, the hardware and software components of these communications devices are not further shown and described. If the reader desires more details, the reader is invited to consult the following sources, all incorporated herein by reference in their entirety: ANDREW TANENBAUM, COMPUTER NETWORKS (4th edition 2003); WILLIAM STALLINGS, COMPUTER ORGANIZATION AND ARCHITECTURE: DESIGNING FOR PERFORMANCE (7th Ed., 2005); and DAVID A. PATTERSON & JOHN L. HENNESSY, COMPUTER ORGANIZATION AND DESIGN: THE HARDWARE/SOFTWARE INTERFACE (3rd. Edition 2004).

The billing application 42 may be implemented regardless of networking environment. The communications network 38 may be a cable network operating in the radio-frequency domain and/or the Internet Protocol (IP) domain. The communications network 38, however, may also include a distributed computing network, such as the Internet (sometimes alternatively known as the "World Wide Web"), an intranet, a local-area network (LAN), and/or a wide-area network (WAN). The communications network 38 may include coaxial cables, copper wires, fiber optic lines, and/or hybrid-coaxial lines. The communications network 38 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Some aspects of multiple communications addresses for a single device are known, so this disclosure will not greatly explain the known details. If the reader desires more details, the reader is invited to consult the following sources, all incorporated herein by reference in their entirety: U.S. Pat. No. 4,677,653 to Weiner et al. (Jun. 30, 1987); U.S. Pat. No. 5,020,091 to Krolopp et al. (May 28, 1991); U.S. Pat. No. 5,371,781 to Ardon (Dec. 6, 1994); U.S. Pat. No. 5,448,622 to Huttunen (Sep. 5, 1995); U.S. Pat. No. 5,764,730 to Rabe et al. (Jun. 9, 1998); U.S. Pat. No. 5,983,095 to Cameron (Nov. 9, 1999); U.S. Pat. No. 5,987,325 to Tayloe (Nov. 16, 1999); U.S. Pat. No. 6,178,335 to Vu (Jan. 23, 2001); U.S. Pat. No. 6,311,063 to Valliani et al. (Oct. 30, 2001); U.S. Pat. No. 6,745,040 to Zimmerman (Jun. 1, 2004); U.S. Pat. No. 6,760,762 to Pezzutti (Jul. 6, 2004); U.S. Pat. No. 7,064,681 to Horstemeyer (Jun. 20, 2006); and Published U.S. Patent Application 2004/0199464 to Bright et al. (Oct. 7, 2004).

Figure 2:
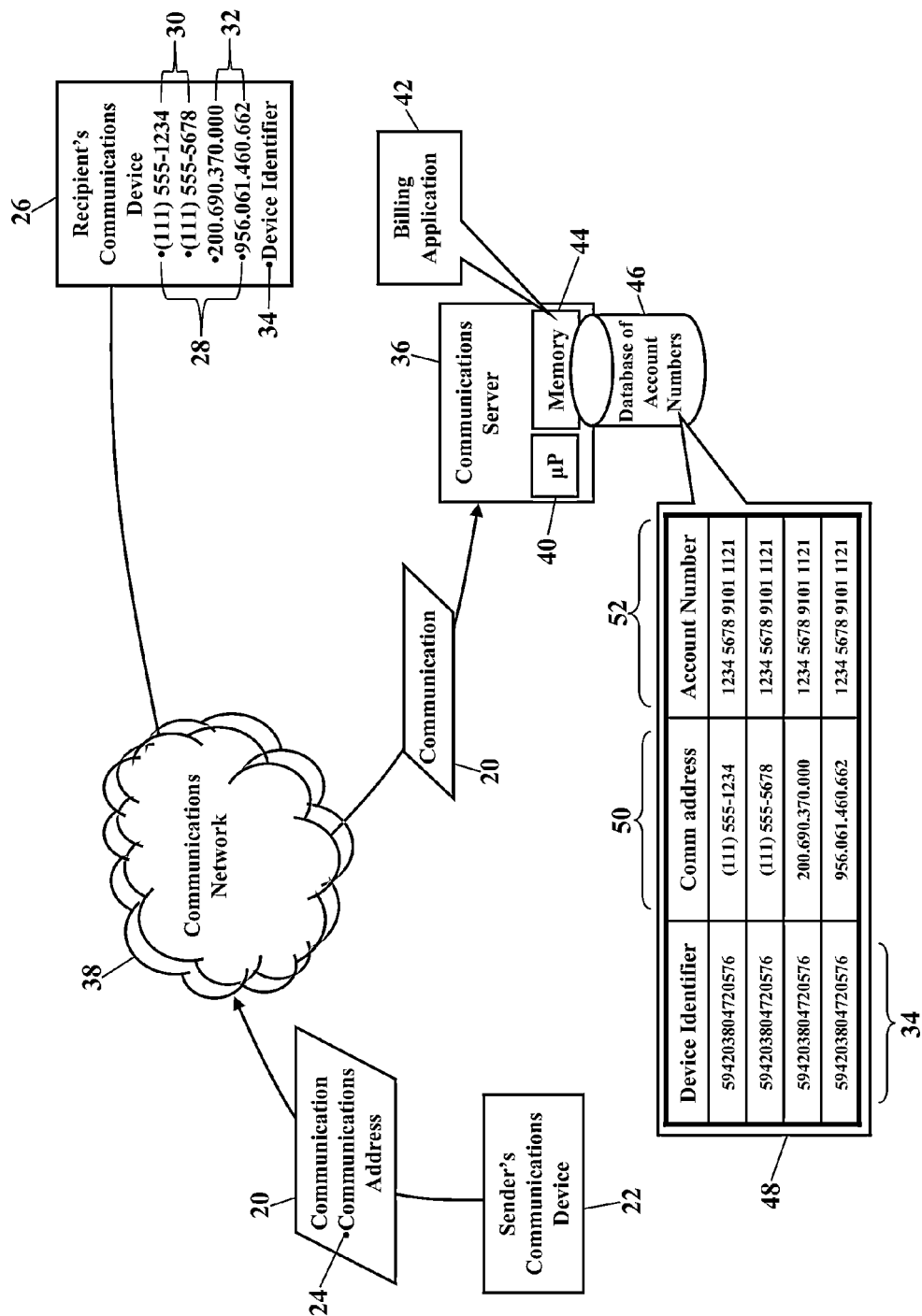
FIG. 2 is a schematic illustrating billing options, according to more exemplary embodiments.

FIG. 2 is a schematic illustrating billing options, according to more exemplary embodiments. Here the recipient has a single account number to which all communications are billed, regardless of the communications address. The communication 20 travels from the sender's communications device 22 to the recipient's communications device 26 via the communications network 38. The communication 20 is associated with the single device identifier 34, regardless of which communications address is used. When the communication 20 is processed by the communications server 36, the billing application 42 may access the database 46 of account numbers. When the billing application 42 instructs the processor 40 to query for the device identifier 34, the database 46 determines that the recipient's device identifier 34 is associated with the multiple communications addresses 28 and 50. The database 46 of account numbers, furthermore, determines that all the multiple communications addresses 50 are associated with the single account number 52. That is, all the recipient's communications, to any of the multiple communications addresses 28 and 50, are billed to the same account number 52. The recipient has thus established a billing scheme in which all sent or received communications are billed to one credit card number or account number. The table 48, for example, illustrates that the single device identifier 34 is associated with the multiple communications addresses 50, and the same account number 52 is listed for each communications address 50. The billing application 42 thus unambiguously bills the account number 52 for the communication 20.

Figure 3:
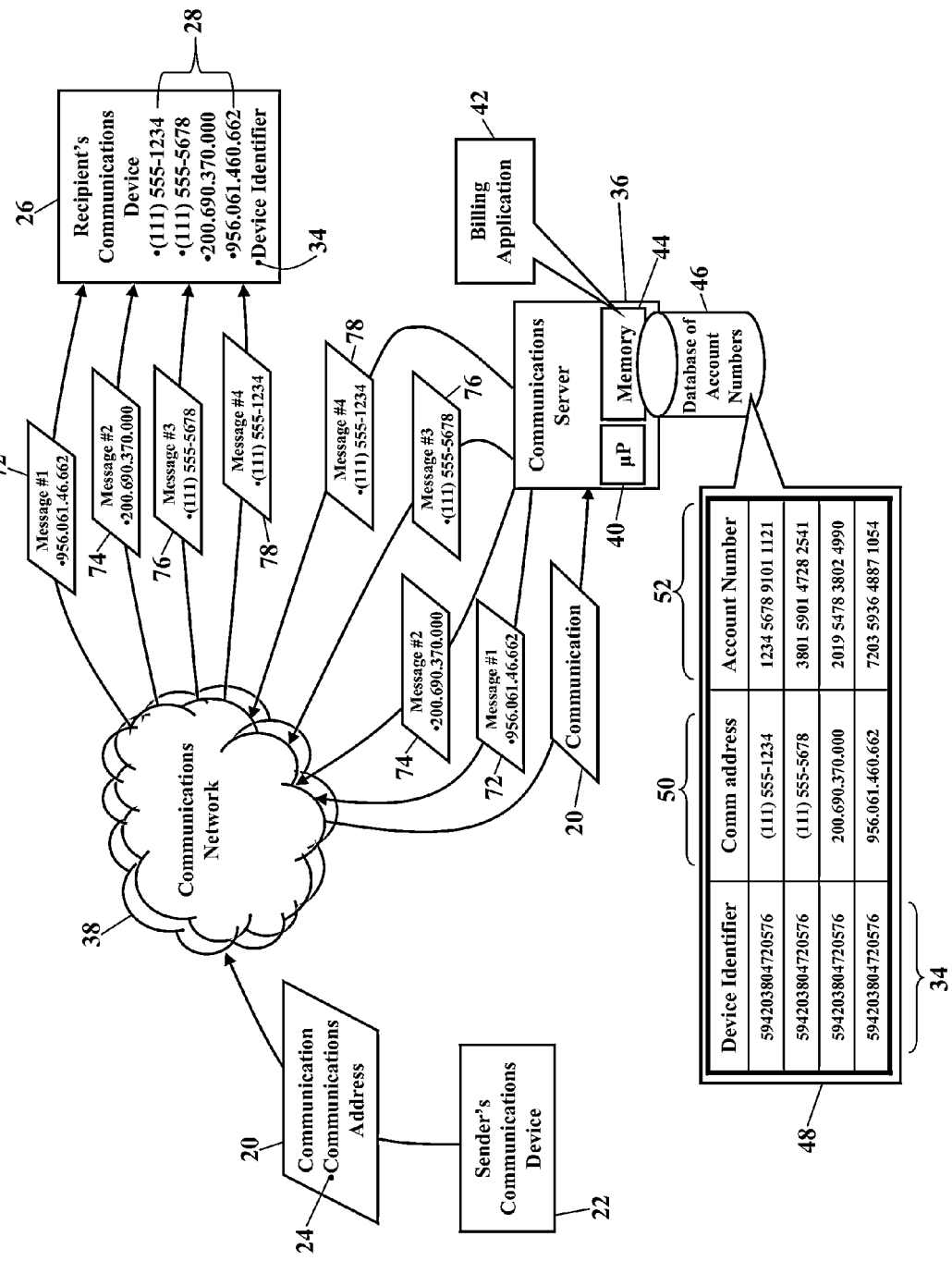
FIGS. 3 and 4 are schematics illustrating additional billing options, according to additional exemplary embodiments.
Figure 4:
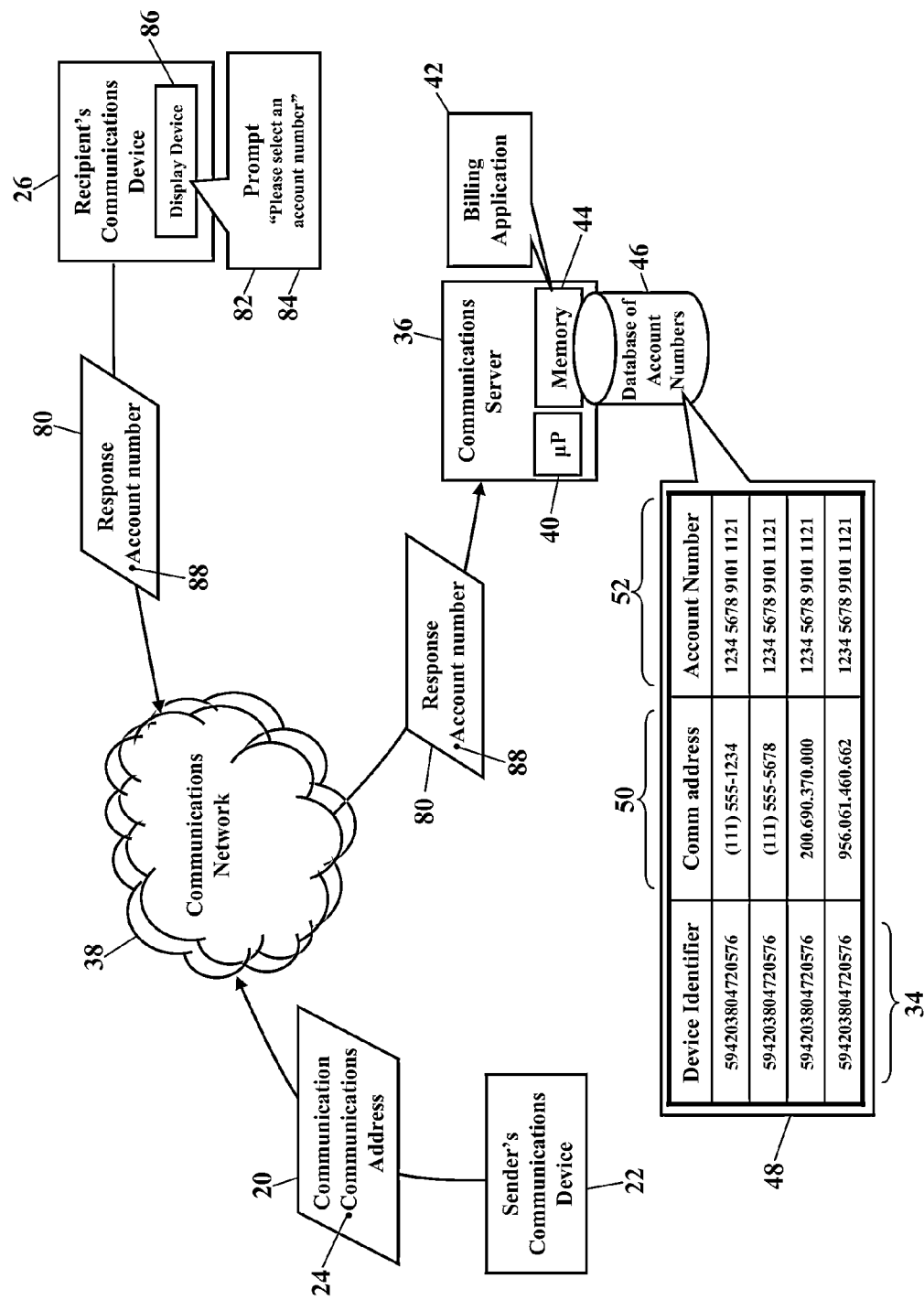

FIGS. 3 and 4 are schematics illustrating additional billing options, according to additional exemplary embodiments. Here, multiple account numbers are associated with the multiple communications addresses 28, so the recipient is prompted to select an account number for billing purposes. As FIG. 3 illustrates, the communication 20 again communicates via the communications network 38 to the communications server 36. The billing application 42 accesses the database 46 of account numbers and queries for the device identifier 34. The database 46 again determines that the recipient's device identifier 34 is associated with the multiple communications addresses 28 and 50. As the table 48 also illustrates, the recipient's multiple communications addresses 50 are also associated with multiple account numbers 52. That is, when the recipient's device identifier 34 is associated with multiple account numbers 52, the billing application 42 may prompt the recipient for a selection. While the billing application 42 may automatically bill an account number, the billing application 42 may prompt the customer to select an account number.

As FIG. 3 illustrates, the billing application 42 may send one or more messages. Each message is addressed to at least one of the multiple communications addresses 28 and 50. FIG. 3, for example, illustrates messages 72, 74, 76, and 78. Each of the respective messages 72, 74, 76, and 78 is addressed to one of the multiple communications addresses 50. Each of the respective messages 72, 74, 76, and 78 also prompts the recipient to select one of the multiple account numbers 52 for billing of the communication 20. Because the billing application 42 may not know the operational mode of the recipient's communications device 26, the billing application 42 preferably sends a message to all of the recipient's multiple communications addresses 50. The messages 72, 74, 76, and 78 prompt the recipient to select one of the account numbers 52 for billing purposes. Suppose the recipient's communications device 26 is configured to reject after-hours calls to a work-related telephone number. That is, the recipient does not want to receive work-related calls during personal hours. If those work-related calls are forwarded to voicemail, the billing application 42 would unsuccessfully solicit a selection. The billing application 42, then, may disperse the messages 72, 74, 76, and 78 to each of the recipient's multiple communications addresses 28. The billing application 42 may sequentially distribute the messages 72, 74, 76, and 78 to each of the recipient's multiple communications addresses 50 and await a response. If no response is received within a predetermined period of time, the billing application 42 may attempt the next communications address. The billing application 42 may alternatively distribute or "flood" the messages 72, 74, 76, and 78 to all of the recipient's multiple communications addresses 50. However the messages are sent, each message 72, 74, 76, and 78 prompts the recipient to select an account number which will be billed for the communication 20.

FIG. 4 illustrates a response 80. When the recipient's communications device 26 receives any of the messages (shown respectively, as reference numerals 72, 74, 76, and 78 in FIG. 3), the recipient's communications device 26 may produce a prompt 82. The prompt 82 visually and/or audibly asks the recipient to select an account number. FIG. 4, for example, illustrates a visual prompt 84 presented by a display device 86 associated with the recipient's communications device 26. The recipient's communications device 26 then sends the response 80, and the response 80 includes information that identifies a selected account number 88. The response 80 communicates via the communications network 38 to the communications server 36. The billing application 42 instructs the processor 40 to retrieve the recipient's selected account number 88 from the response 80. The billing application 42 then bills the selected account number 88 for the communication 20.

Figure 5:
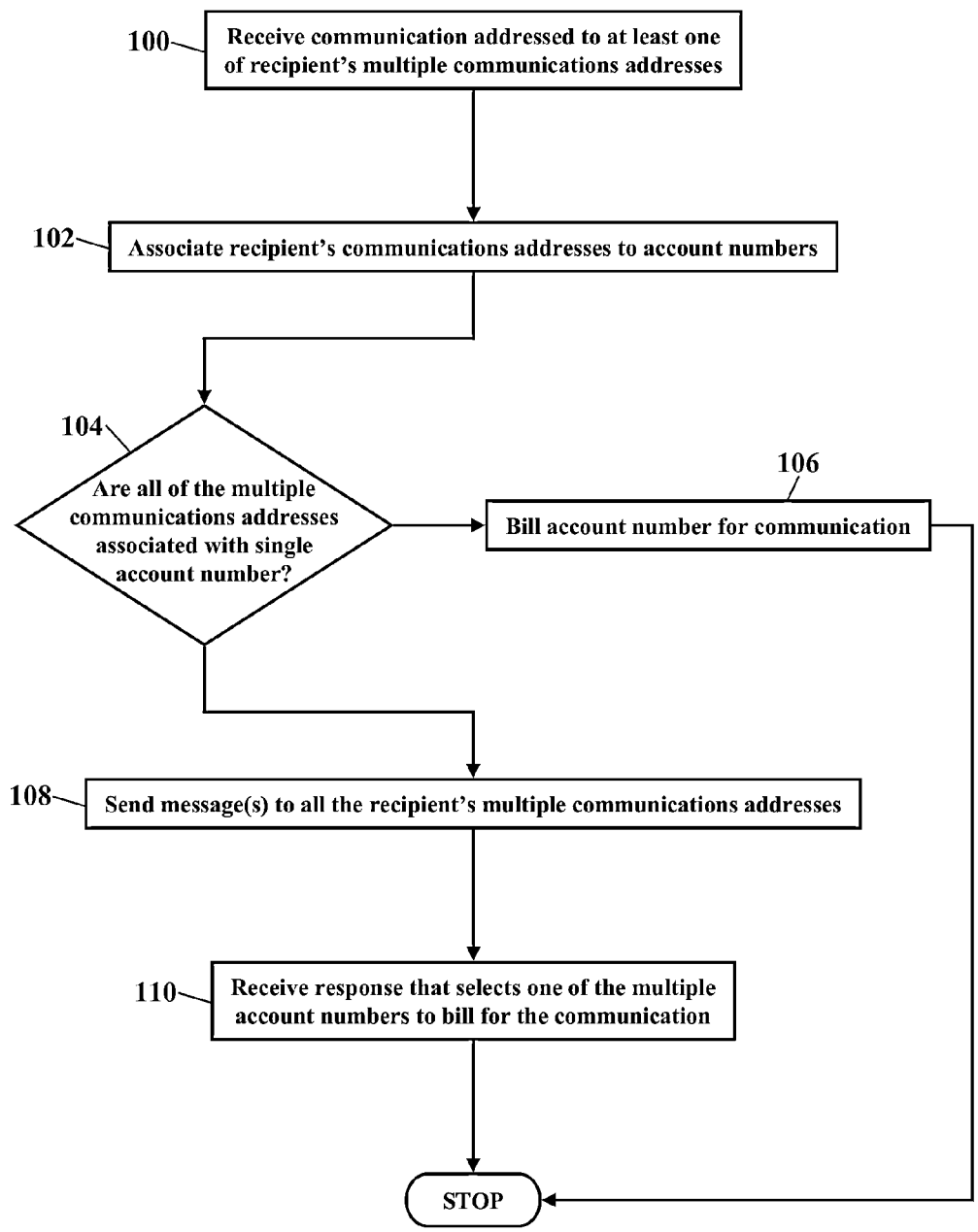
FIG. 5 is a flowchart illustrating a method for processing a communication, according to exemplary embodiments.

FIG. 5 is a flowchart illustrating a method for processing a communication, according to exemplary embodiments. The communication is received and is addressed to at least one of a recipient's multiple communications addresses (Block 100). The recipient's communications addresses are associated to account numbers (Block 102). If all of the multiple communications addresses are associated with a single account number (Block 104), then that account number is billed for the communication (Block 106). If, however, the recipient's communications addresses are associated with multiple account numbers (Block 104), then a message is sent to all the recipient's multiple communications addresses (Block 108). The message prompts the recipient to select one of the multiple account numbers for billing of the communication. A response is received that selects one of the multiple account numbers to bill for the communication (Block 110).

Figure 6:
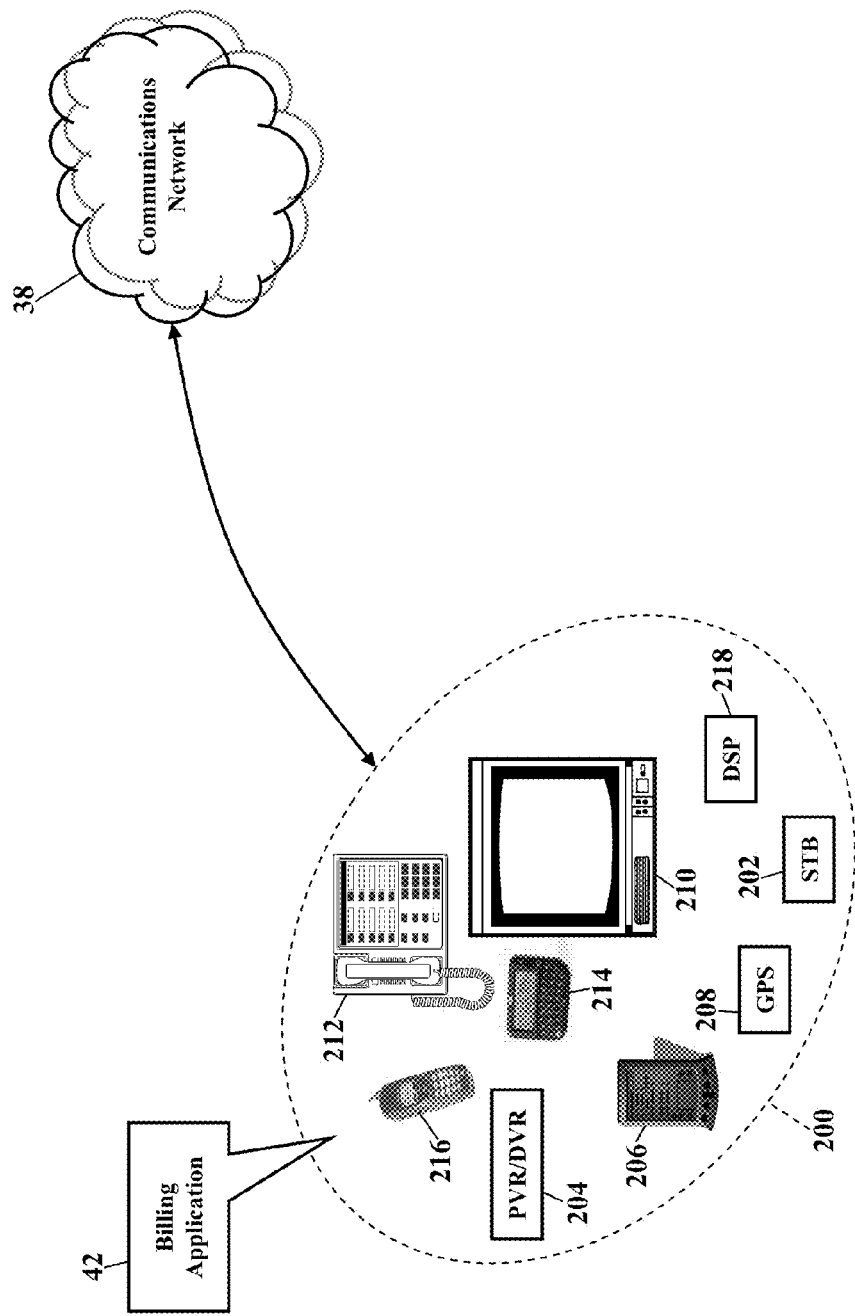
FIG. 6 depicts other possible operating environments for additional aspects of the exemplary embodiments.

FIG. 6 depicts other possible operating environments for additional aspects of the exemplary embodiments. FIG. 6 illustrates that the billing application 42 may alternatively or additionally operate within various other communications devices 200. FIG. 6, for example, illustrates that the billing application 42 may entirely or partially operate within a set-top box (202), a personal/digital video recorder (PVR/DVR) 204, personal digital assistant (PDA) 206, a Global Positioning System (GPS) device 208, an interactive television 210, an Internet Protocol (IP) phone 212, a pager 214, a cellular/satellite phone 216, or any computer system and/or communications device utilizing a digital signal processor (DSP) 218. The communications device 200 may also include watches, radios, vehicle electronics, clocks, printers, gateways, and other apparatuses and systems. Because the architecture and operating principles of the various communications devices 200 are well known, the hardware and software componentry of the various communications devices 200 are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME)* interface (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004).

The billing application 42 may be physically embodied on or in a computer-readable media or medium. This computer-readable media/medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the exemplary embodiments, allow easy dissemination. A computer program product comprises the billing application 42 stored on the computer-readable media or medium. The billing application 42 comprises computer-readable instructions/code for processing communications, as hereinabove explained. The billing application 42 may also be physically embodied on or in any addressable (e.g., HTTP, I.E.E.E. 802.11, Wireless Application Protocol (WAP), or BLUETOOTH®) wireless device capable of presenting an IP address.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
    processing a communication from a sender's communications address to a recipient communications address of multiple recipient communications addresses all associated with a single transceiver number identifying a transceiver in a recipient device;
    querying a database for the single transceiver number associated with the recipient device;
    determining that multiple credit card account numbers are associated with the single transceiver number;
    querying a database of credit card accounts for the recipient communications address, the database of credit card accounts storing a table that associates the multiple recipient communications addresses to credit card account numbers;
    retrieving one of the credit card account numbers that is associated with the recipient communications address; and
    billing the one of the credit card account numbers for a cost of the communication.

2. The method according to claim 1, further comprising retrieving a billing scheme associated with the one of the credit card account numbers.

3. The method according to claim 1, further comprising retrieving a mobile identification number.

4. The method according to claim 1, further comprising retrieving a serial number.

5. A system, comprising:
a processor; and
memory storing code that when executed causes the processor to perform operations, the operations comprising:
processing a communication from a sender's communications address to a recipient communications address of multiple recipient communications addresses all associated with a single transceiver number identifying a transceiver in a recipient device;
querying a database for the single transceiver number associated with the recipient device;
determining that multiple credit card account numbers are associated with the single transceiver number;
querying a database of credit card accounts for the recipient communications address, the database of credit card accounts storing a table that associates the multiple recipient communications addresses to credit card account numbers;
retrieving one of the credit card account numbers that is associated with the recipient communications address; and
billing the one of the credit card account numbers for a cost of the communication.

6. The system according to claim 5, wherein the operations further comprise summing a number of packets in the communication.

7. The system according to claim 6, wherein the operations further comprise retrieving a fee for each packet in the communication.

8. The system according to claim 7, wherein the operations further comprise calculating the cost of the communication based on the number of packets and the fee for each packet.

9. The system according to claim 7, wherein the operations further comprise multiplying the number of packets by the fee for each packet.

10. The system according to claim 5, wherein the operations further comprise retrieving a billing scheme associated with the one of the credit card account numbers.

11. The system according to claim 5, wherein the operations further comprise retrieving a mobile identification number.

12. The system according to claim 5, wherein the operations further comprise retrieving a serial number.

13. A memory storing instructions that when executed cause a processor to perform operations, the operations comprising:
processing a communication from a sender's communications address to a recipient communications address of multiple recipient communications addresses all associated with a single transceiver number identifying a transceiver in a recipient device;
querying a database for the single transceiver number associated with the recipient device;
determining that multiple credit card account numbers are associated with the single transceiver number;
querying a database of credit card accounts for the recipient communications address, the database of credit card accounts storing a table that associates the multiple recipient communications addresses to credit card account numbers;
retrieving one of the credit card account numbers that is associated with the recipient communications address; and
billing the one of the credit card account numbers for a cost of the communication.

14. The memory according to claim 13, wherein the operations further comprise summing a number of packets in the communication.

15. The memory according to claim 14, wherein the operations further comprise retrieving a fee for each packet.

16. The memory according to claim 15, wherein the operations further comprise calculating the cost of the communication based on the number of packets and the fee for each packet.

17. The memory according to claim 15, wherein the operations further comprise multiplying the number of packets by the fee for each packet.

18. The memory according to claim 13, wherein the operations further comprise retrieving a billing scheme associated with the one of the credit card account numbers.

19. The memory according to claim 13, wherein the operations further comprise retrieving a mobile identification number.

20. The memory according to claim 15, wherein the operations further comprise for retrieving a serial number.

* * * * *